US012738074B1

(12) United States Patent
Núñez et al.

(10) Patent No.: US 12,738,074 B1
(45) Date of Patent: Sep. 15, 2026

(54) SYSTEMS AND METHODS FOR TRAFFIC SIGN DETECTION

(71) Applicant: Geotab Inc., Oakville (CA)

(72) Inventors: Jorge González Núñez, Madrid (ES); Álvaro Alcalde Cid, Madrid (ES); Daniel Pérez Rubio, Azuqueca de Henares (ES); Mohammed Sohail Siddique, Milton (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 19/426,954

(22) Filed: Dec. 19, 2025

Related U.S. Application Data

(60) Provisional application No. 63/845,556, filed on Jul. 17, 2025.

(51) Int. Cl.
*G06V 10/00* (2022.01)
*G01C 21/00* (2006.01)
(Continued)

(52) U.S. Cl.
CPC ....... *G06V 20/582* (2022.01); *G01C 21/3815* (2020.08); *G01C 21/3841* (2020.08);
(Continued)

(58) Field of Classification Search
CPC ........ G06N 20/00; G06N 20/10; G06N 20/20; G06N 3/02; G06N 3/08; G06N 3/042;
(Continued)

(56) References Cited

U.S. PATENT DOCUMENTS 9,195,895 B1 * 11/2015 Kapach ................ G06V 20/582
10,042,359 B1 * 8/2018 Konrardy .............. G01C 21/34
(Continued)

OTHER PUBLICATIONS

Qi et al. (CN 117372633 ARoad Boundary Generating Method and Device Based on Three-dimensional Road Surface); date published Jan. 9, 2024.*

(Continued)

*Primary Examiner* — Amir Alavi
(74) *Attorney, Agent, or Firm* — Gabriel F. Rogers

(57) ABSTRACT

A method and system are provided for enhancing map data of a road network by automatically generating a dataset of traffic signs. The method includes receiving telematics data from a plurality of vehicles and receiving map data comprising a plurality of road edges. A point of interest associated with at least one road edge is determined based on a vehicle movement metric derived from the telematics data, such as speed- or stop-related patterns. A sequence of one or more images associated with the point of interest is obtained from an image capture device mounted to a vehicle traversing the point of interest. At least one image from the sequence is analyzed using an image-processing machine learning model to detect a traffic sign, and the detected traffic sign is used to enhance the map data. The approach focuses image analysis on selected portions of the road network and reduces data processing by limiting analysis to relevant images, thereby enabling efficient generation of a reliable, updated dataset of traffic signs.

20 Claims, 5 Drawing Sheets

(51) Int. Cl.

| | |
|---|---|
| ***G06V 10/70*** | (2022.01) |
| ***G06V 20/56*** | (2022.01) |
| ***G06V 20/58*** | (2022.01) |
| ***G06V 20/62*** | (2022.01) |
| ***G06V 30/10*** | (2022.01) |

(52) U.S. Cl.

CPC ............ *G06V 10/70* (2022.01); *G06V 20/588* (2022.01); *G06V 20/63* (2022.01); *G06V 30/10* (2022.01)

(58) Field of Classification Search

CPC ........ G06N 3/045; G06N 3/047; G06N 3/082; G06N 3/088; G06N 3/092; G06N 3/0454; G06N 3/0475; G06N 3/0464; G06V 10/70; G06V 10/82; G06V 10/85; G06V 10/761; G06V 10/762; G06V 10/764; G06V 10/765; G06V 10/7715; G06V 20/582; G06V 20/63; G06V 20/588; G06V 30/10; G01C 21/3841; G01C 21/3815

See application file for complete search history.

(56) References Cited

U.S. PATENT DOCUMENTS

| | | | | |
|---|---|---|---|---|
| 10,402,665 | B2 * | 9/2019 | Kapach | G06V 20/582 |
| 10,452,069 | B2 * | 10/2019 | Stein | G08G 1/09623 |
| 10,599,155 | B1 * | 3/2020 | Konrardy | G06N 3/045 |
| 11,113,545 | B2 * | 9/2021 | Kundu | G06V 20/582 |
| 11,385,058 | B2 * | 7/2022 | Prabhakar | G08G 1/165 |
| 11,860,979 | B2 * | 1/2024 | Cardona | B60W 40/105 |
| 12,169,985 | B1 * | 12/2024 | Gataric | G06Q 40/08 |
| 12,306,010 | B1 * | 5/2025 | Rommel | G01C 21/3822 |
| 12,511,994 | B2 * | 12/2025 | Karakayis | G06V 20/582 |
| 12,525,029 | B2 * | 1/2026 | Singh | G06V 10/26 |

OTHER PUBLICATIONS

Gao et al. (CN 117824695 A, Multi-dimensional Intelligent Driving Path Planning System); date published Apr. 5, 2024.*

* cited by examiner

400

SYSTEMS AND METHODS FOR TRAFFIC SIGN DETECTION

TECHNICAL FIELD

The present disclosure generally relates to methods, devices for enhancing map data of a road network. More specifically, it relates to methods and systems for automatically detecting traffic signs on a determined portion of a roadway using telematics data collected from a plurality of vehicles, map data and image data captured by vehicles traversing the determined portion of a roadway.

BACKGROUND

Vehicles are increasingly equipped with telematics devices that collect a wide range of telematics data. The telematics data may be used to gain insights about diverse aspects of the vehicles. For example, the telematics data may include data relating to various components of the vehicle (e.g., engine data, ignition data, brake data, etc.), location data (e.g., GPS location), vehicle identifying information, etc. Furthermore, the telematics data may be used to gain insights about the geographical area or areas within which the vehicles operate. For example, using telematics data such as location data, a geographical location which a vehicle traverses may be determined. Hereby the telematics data are correlated with digital maps.

Generally, the digital maps are fundamental for navigation and serve as a base in the advanced driver-assistance systems. Conventionally, the digital maps are generated based on map data received from official government sources. That kind of map data is however often incomplete or outdated and even if the map data is recorded, it is often treated isolated from other municipal government databases. That leads to challenges in building a cohesive, universal road network database.

To try to solve this problem, road network databases (e.g., OpenStreetMap) with cartographic information have been created that are open and broadly accessible to every user. These types of databases contain map data that are built on users' contribution. Consequently, the collection of map data depends on the users' input wherein the entered data is often not verified, which can lead to incorrect, outdated, or unreliable map data. Therefore, major digital map databases lack of providing a reliable and updated information, in particular about the presence of traffic signs such as speed limit signs or stop signs.

Thus, conventional digital maps are often incomplete or outdated due to missing comprehensive digital map data. In particular, traffic signs that impact safety of traffic participants, such as speed limit signs or stop signs are often missing or outdated. These deficiencies degrade the reliability of digital maps used by navigation and driver-assistance systems.

SUMMARY

Accordingly, there is a demand to provide a solution which at least partially addresses one or more of the challenges mentioned above. It is a further demand to provide a solution for enhancing map data with a dataset that is more precise, updated and reliable. In particular, there is a demand to provide a more reliable solution for automatic and computationally efficient generation of a reliable and verified dataset of traffic signs.

The needs are met by the features of the independent claims. Further aspects are described in the dependent claims.

According to one aspect, the present disclosure relates to a method for enhancing map data of a road network. The method comprises operating at least one processor to carry out the method steps. The method steps comprise receiving telematics data originating from a plurality of telematics devices installed in a plurality of vehicles. Further the method steps comprise receiving the map data, the map data comprising a plurality of road edges. Further the method steps comprise determining a point of interest associated with at least one road edge of the plurality of road edges, wherein the determination of the point of interest is based on a vehicle movement metric derived from the telematics data of the plurality of vehicles traversing the at least one road edge. Furthermore, the method steps comprise determining a sequence of one or more images associated with the determined point of interest wherein the sequence of one or more images is captured by an image capture device positioned at a vehicle traversing the determined point of interest. Furthermore, the method steps comprise analyzing at least one image in the sequence of one or more images using a machine learning model to detect a traffic sign therein for using the detected traffic sign to enhance the map data.

According to another aspect, the present disclosure relates to a system for enhancing map data of a road network. The system comprises at least one data storage operable to store telematics data originating from a plurality of telematics devices installed in a plurality of vehicles. Further the system comprises at least one processor in communication with the at least one data storage. The at least one processor is operable to receive telematics data originating from a plurality of telematics devices installed in a plurality of vehicles. Further the at least one processor is operable to receive map data, the map data comprising a plurality of road edges. Furthermore, the at least one processor is operable to determine a point of interest associated with at least one road edge of the plurality of road edges, wherein the determination of the point of interest is based on a vehicle movement metric derived from the telematics data of the plurality of vehicles traversing the at least one road edge. The at least one processor is further operable to determine a sequence of one or more images associated with the determined point of interest wherein the sequence of one or more images is captured by an image capture device positioned at a vehicle traversing the determined point of interest, and to analyze at least one image from the sequence of one or more images using a machine learning model to detect a traffic sign therein for using the detected traffic sign to enhance the map data.

Aspects of the present disclosure thus provide methods and systems that enhance map data by generating automatically a more reliable, updated and larger dataset of traffic signs in an efficient manner. In particular, an efficient analysis of images is proposed with respect to computationally efficiency. Consequently, instead of relying on incomplete governmental data, the present disclosure generates an own ground-truth dataset, which can then be used to update map data or to be used for training a more accurate and robust traffic sign prediction model.

BRIEF DESCRIPTION OF THE DRAWINGS

These and other features of the present disclosure will become more apparent in the following detailed description in which reference is made to the appended drawings. The appended drawings illustrate one or more embodiments of the present disclosure by way of example only and are not to be construed as limiting the scope of the present disclosure.

DETAILED DESCRIPTION

Figure 1:
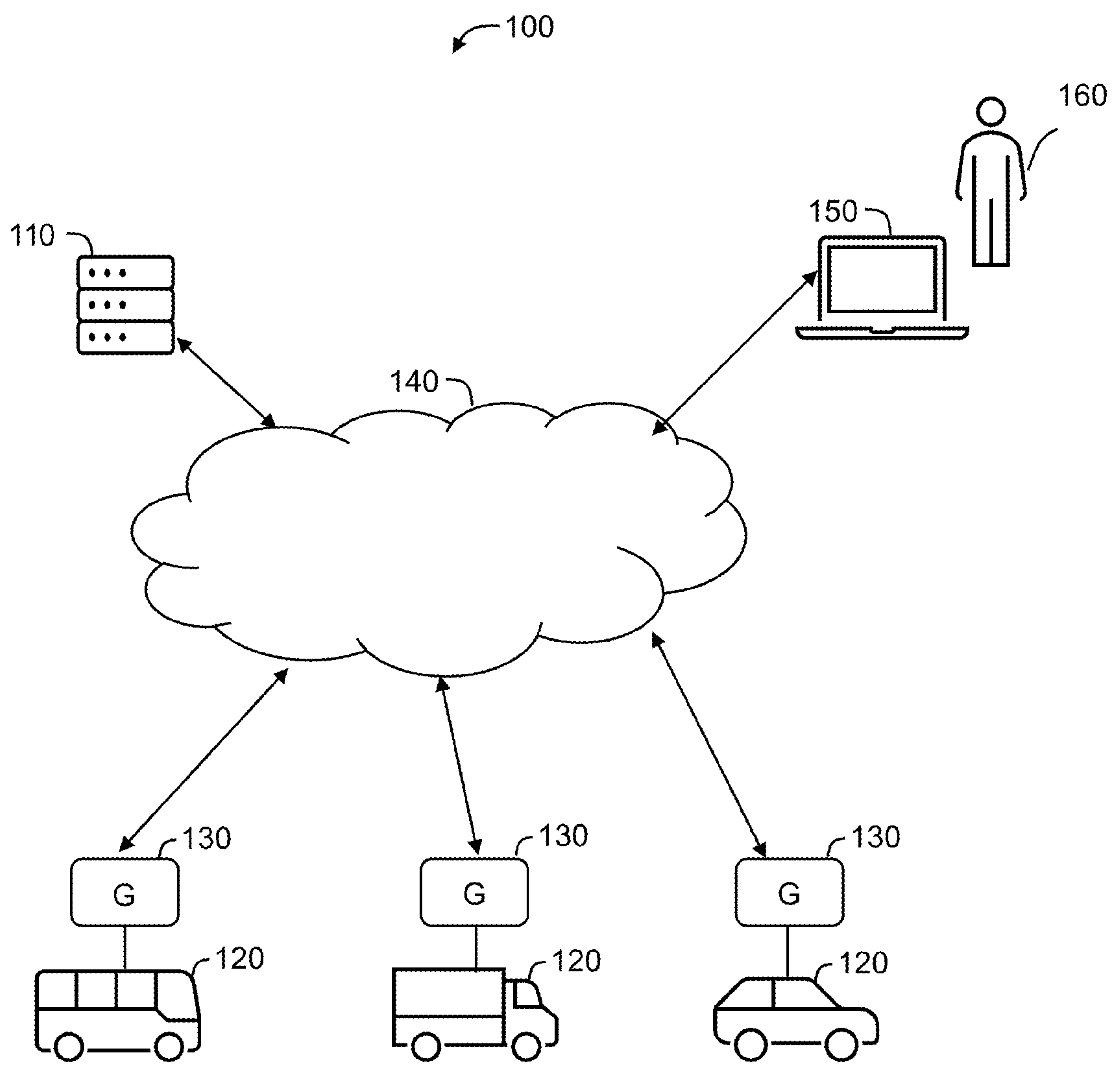
FIG. 1 is a schematic block diagram of various components interacting with an example asset management server according to an embodiment of the present disclosure.

The aspects, scenarios, features and advantages of the present disclosure will be described more fully through the following illustrative and non-limiting detailed description of embodiments with references to the accompanying figures. It is to be understood that the aspects and features may be embodied in many different forms and the features of the embodiments described and explained hereinafter may be combined with each other in other embodiments or may be considered in isolation and should not be construed as limiting. Features from one embodiment may be assumed to be present or used in another embodiment. Other devices, systems, methods and features will become apparent to one skilled in the art upon examination of the following detailed description and the accompanying figures.

According to the present disclosure, an efficient generation of dataset with traffic signs, in particular speed limit signs and/or stop signs is proposed. First a point of interest is determined that is associated with at least one road edge having a high probability of traffic sign presence. The determination of the point of interest is based on a vehicle movement metric. In one example speed entropy is calculated for those road edges in the road network that potentially may form a point of interest and thus the speed entropy serves as an example of vehicle movement metric. Further the present disclosure proposes to analyze at least one image from a sequence of one or more images that are captured by an image capture device mounted to a vehicle traversing the determined point of interest. The purpose of the image analysis is to detect traffic signs on the road the vehicle is traversing.

Especially, the various aspects of the present disclosure allow to focus the image analysis for detecting a traffic sign in one or more of the images captured by a vehicle, only to a fraction of the road network, namely to the point of interest. The point of interest with the assigned at least one road edge is the fraction of the road network where traffic signs are likely to be present. With this approach, the amount of image data that needs to be processed to detect a traffic sign is reduced to the determined point of interest. The efficiency of the image analysis may be further enhanced by an additional selection of images to be processed, namely by extracting the most informative image (e.g., keyframe) from the captured sequence of one or more images (e.g., video). Further, the present disclosure proposes to apply a suitable computer-vision technique, for example a suitable image-processing machine learning model, to detect a traffic sign on the selected image. As it should be appreciated there are different known image-processing machine learning models, such as multimodal LLMs, convolutional neural networks, vision transformers, generative adversarial networks etc. In particular, the advantage of a multimodal LLM (e.g., GPT-4 Vision, Gemini models) is that it is capable of processing both image and text without the need to be trained on specific and labeled data for detecting traffic signs.

The present disclosure with the hereafter illustrated examples and embodiments may be implemented in a telematics system.

Referring to FIG. 1, there is shown an example of telematics system 100 comprising an asset management server 110 for managing a plurality of assets 120 equipped with a plurality of telematics devices 130. For ease of exposition, "vehicle" will be used interchangeably to represent an asset 120. In some implementations, the asset management server 110 may be an implementation of a fleet management system. In operation, the telematics device 130 can gather various data (i.e., telematics data) associated with the vehicle 120 and share the telematics data with the asset management server 110.

The vehicles 120 may include any machines for transporting goods or people or vehicles for performing tasks (e.g., construction vehicles) etc. The vehicles 120 may include motor vehicles, such as, but not limited to, motorcycles, cars, trucks, and/or buses. In some examples the vehicles may use an internal combustion engine (ICE) that can run on petrol, diesel and/or alternative fuel. In other examples, the vehicle can be an electric vehicle (EV) or a hybrid vehicle. In some cases, the vehicles 120 may include other kinds of vehicles, such as, watercraft (e.g., ships, boats), aircraft (e.g., airplanes, helicopters), and/or spacecraft. Each vehicle 120 may be equipped with a telematics device 130. Although only three vehicles 120 having three telematics devices 130 are shown in FIG. 1, it should be appreciated that there can be any number of vehicles 120 and telematics devices 130.

In operation, the telematics device 130 when interacting with a vehicle 120 is capable of gathering various telematics data related to the vehicle and/or the operation of the vehicle and transmits the telematics data to the asset management server 110 over the network 140.

The telematics devices 130 are electronic devices which can be standalone devices that are removably installed in the vehicles 120, such as, but not limited to, vehicle tracking devices, vehicle diagnostic devices, and/or combinations thereof. Alternatively, the telematics device 130 can be integrated or embedded components that are integral with the vehicles 120, such as, but not limited to, telematic control units (TCUs). The telematics device 130 is configured to collect telematics data associated with a vehicle 120 when the telematics device 130 is coupled to the vehicle 120. In some examples, the telematics device 130 may be configured to collect telematics data directly. In some implementations, the direct collection may be performed using a sensor, wherein a particular sensor is configured to sense at least one characteristic of the environment the sensor is arranged for. In other implementations, the telematics device 130 may include modules, such as a location module configured to determine the location of the telematics device. In yet other implementations, the telematics devices 130 may be arranged to receive and process telematics data sent from peripherally attached input/output devices (e.g., camera, monitoring devices, operations devices etc.) that are operable to generate additional control and/or operation data.

The telematics data include any information, parameters, attributes, characteristics, and/or features associated with the vehicle 120 and its environment. For example, the telematics data may include, but is not limited to, location data, speed data, acceleration data, engine data, brake data, transmission data, fluid data (e.g., oil, coolant, and/or washer fluid), energy data (e.g., battery and/or fuel level), odometer data, error/diagnostic data, tire pressure data, seatbelt data, captured image data and/or airbag data. Some aspects of the usage of the telematics data are described further below. In some embodiments, the telematics data may include information relating to the telematics devices 130 and/or other devices associated with or connected to the telematics devices 130. Regardless, it should be appreciated the telematics data is a form of electronic data that can be transmitted, received, interpreted, processed, and/or stored.

In operation, the asset management server 110 is adapted to process the telematics data obtained from the telematics devices 130 to provide various analysis, predictions, reporting, etc. In some implementations, the asset management server 110 may process the telematics data to provide additional information about the vehicles 120 and their components, such as, but not limited to, vehicle trip data such as trip distances and times, idling times, harsh braking and driving, usage rates, fuel economy, and the like. Various data analytics techniques may be implemented to process the telematics data. In some cases, the telematics data may be combined with map data, such as roadway identifiers, for example to derive times a roadway has been traversed. The combined data may be used to manage various aspects, such as routing planning, asset utilization, updating of map data based on the processed telematics data (e.g., with a dataset comprising traffic signs that have been derived as described further below), which in turn may improve productivity, efficiency, safety and/or sustainability of the vehicles 120.

The asset management server 110 may be implemented using any suitable computer platform, which may be based on one or more computers or one or more computer servers. The computer servers may be arranged centralized or distributed across a wide geographical area. In some implementations, the asset management server 110 may be implemented as a dedicated physical server or it may be implemented using a cloud computing platform based on virtualized entities. A virtualized entity may be a virtualized logical entity hosted by one or more hosts.

The asset management server 110 may be managed by one asset operator, or it may be managed by different asset operators (e.g., by a fleet owner and/or by any user, such as an asset data management operator that provides additional telematics services, including additional information on map data). In some implementations, the data processed by the asset management server 110 may be used by further entities, (not depicted in FIG. 1). For example, one or more additional remote servers may be provided that are adapted to receive data from the asset management server 110 to use them for a specific application, such as a server adapted to administrate map data. The additional remote server may also be arranged centralized or distributed across a wide geographical area as it is described in connection with the asset management server 110. In general, the term "remote server" refers to a server that is capable to fulfill the function of the asset management server 110 or to a combination of the asset management server 110 and an additional remote server fulfilling a portion of the functionality of the asset management server 110, such as administration and updating of map data based on the telematics data received from the asset management server 110.

The exemplary computing device 150 (i.e. there may be a plurality of computing devices 150) may provide access to the asset management server 110 for the operator 160. The operator 160 may use the computing device 150 to access or retrieve various telematics data collected and/or processed by the asset management server 110 or by a telematics device 120. As will be appreciated, the computing device 150 may be any suitable computing device. For example, the computing device 150 may be any type of computers such as, but not limited to, personal computers, portable computers, wearable computers, workstations, desktops, laptops, smartphones, tablets, smartwatches, personal digital assistants (PDAs), mobile devices, and the like.

The network 140 represents any exemplary suitable communication network that is capable of providing communication between communicating entities. The network 140 that may comprise one or more interconnected networks may be wireless, wired, or a combination thereof. For example, the network 140 may include, but is not limited to, Wi-Fi™ networks, Ethernet networks, Bluetooth™ networks, Near-Field Communication (NFC) networks, radio networks, cellular networks, and/or satellite networks. The networks building the network 140 may be private, public, or a combination thereof. For example, the network 140 may include, but is not limited to, LANs (local area networks), WANs (wide area networks), and/or the Internet.

Figure 2:
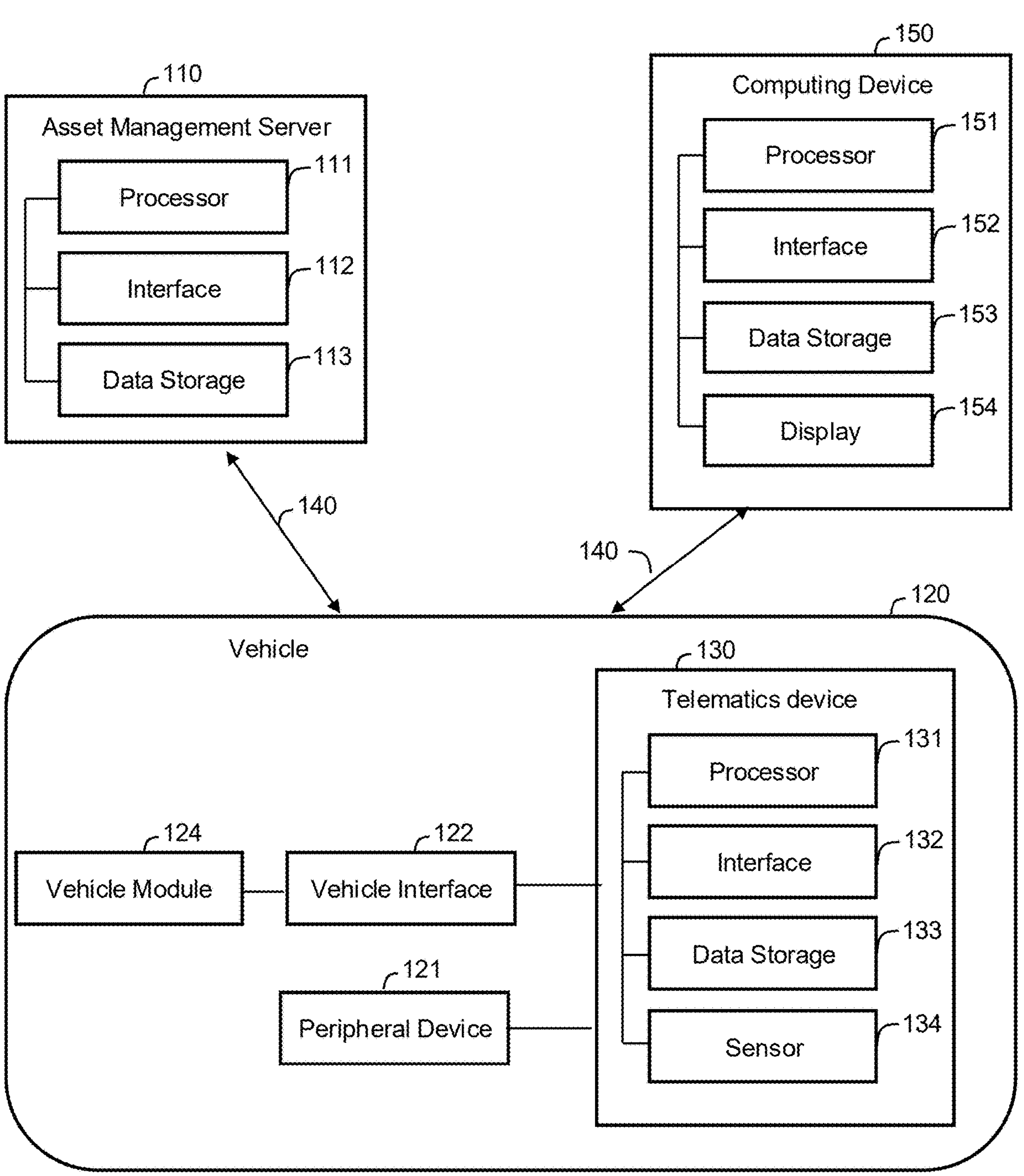
FIG. 2 is a schematic block diagram of an exemplary asset management server interacting with an exemplary telematics device, an exemplary vehicle and an exemplary computing device, according to an embodiment of the present disclosure.

Referring now to FIG. 2, an example of the arrangements of the asset management server 110, the telematics device 130, the vehicle 120 and the computing device 150 are illustrated. In the illustrated example, the asset management server 110 is in communication with the telematics device 130 installed in the vehicle 120 and with the computing device 150.

As illustrated, the telematics device 130 includes a processor 131, a data storage 133, an interface 132, and a sensor 134. The processor 131 may be arranged as a processor circuit. The data storage 133 may be implemented using any suitable memory and may comprise one or more memory modules. The processor 131, the data storage 133, the interface 132, and the sensor 134 are connected via one or more internal bus systems.

Throughout this disclosure, for the sake of simplicity, the terms, "the processor", "the data storage" and "the interface" are referred to in singular form. It should be appreciated that this is without any limitation as to the complexity of their implementation.

The processor 131 is adapted to operate the telematics device 130 by executing software instructions stored on the data storage 133 to implement various methods described herein. For example, the processor 131 may process various telematics data obtained from the vehicle module 124 and/or the sensors 134. The processor 131 may be arranged as a processor circuit and may be implemented in any suitable and preferable way, such as, but not limited to, a microprocessor, Central Processing Unit (CPU), Graphics Processing Unit (GPU), Application-Specific Integrated Circuits (ASICS), a Field-Programmable Gate Arrays (FPGAs) etc.

The interface 132 is adapted to send and receive corresponding output and input information. In some scenarios, the interface 132 may be implemented to receive, collect telematics data from one or more of the sensors 134, the peripheral device 121 and/or the vehicle module 124. In other scenarios, the interface 132 may be a communication interface capable of providing connectivity to the asset management server 110 to send the collected telematics data over the communication network 140. The interface 132 may be implemented in any suitable way using an appropriate modem. In some implementations, the interface 132 may be a wired interface. For example, the interface 132 may include various physical connectors, ports, or terminals, such as, but not limited to, USB (universal serial bus), Ethernet, Thunderbolt, Firewire, SATA (serial advanced technology attachment), PCI (peripheral component interconnect), HDMI (high-definition multimedia interface), and/or DisplayPort. In other implementations the communication interface may comprise one or more wireless interface components to connect to wireless networks, such as, but not limited to, Wi-Fi™, Bluetooth™, NFC, cellular, and/or satellite.

The data storage 133 is adapted to store data received from various sources, such as the sensor 134, the vehicle module 124, the peripheral device 121 or data processed by the processor 131. Further, the data storage 133 may comprise software or program code (e.g. firmware) containing instructions that when executed by the processor 131, the instructions cause the telematics device 130 to carry out operations and methods described herein. The data storage 133 may be implemented in any suitable way, such as a Random-Access Memory (RAM), a Read-Only-Memory (ROM), flash memory, hard disc drives, optical disc drives, memory cards etc.

Further, the telematics device 130 include a sensor 134. There may be one or more sensors 134 included that comprise any suitable sensing interfaces or sensing devices adapted to detect and/or measure events and/or changes in the environment. The sensor 134 may be for example a location sensor, velocity sensor, acceleration sensor, orientation sensor, vibration sensor, proximity sensor, temperature sensor, humidity sensor, pressure sensor, optical sensor, and/or audio sensor. For instance, the sensor 134 may utilize Global Positioning System (GPS) technology (e.g., GPS receiver) for determining the geographic position (e.g., latitude/longitude coordinates) of the vehicle 120. Alternatively, the sensor 134 may be adapted to utilize another technology to determine geographic position.

As illustrated, the telematics device 130 may interact with the vehicle 120 that comprises vehicle module 124, vehicle interface 122 and one or more input/output (I/O) expansion device, so called peripheral device 121.

The peripheral device 121 may be arranged as an input/processing/output module that extends the possibilities of monitoring and collecting additional telematics data or to extend the functionalities of the telematics device 130. In some examples, the peripheral device 121 is arranged as an on-board device (OBD). One example of a peripheral device 121 is an image capture device, such as, but not limited to, a dash cam, video camera, smart video camera, etc. The image capture device is adapted to capture image data in a field of view of the respective image sensor. In some cases, the image capture device may be positioned and oriented to capture image data representing a field of view outside the vehicle (e.g., a dash cam, rear view cam, or other camera pointed externally to the vehicle). In other cases, the image capture device may be positioned and oriented to capture image data representing a field of view inside the vehicle (e.g., a driver-facing camera, a camera aimed at an instrument panel, or other camera pointed internally in the vehicle). The peripheral device 121 may be extended with a data storage to store any data (e.g., captured images) generated by or sent to the peripheral device 121.

One or more peripheral device may be installed in the vehicle 120 and connected to the telematics device 130 accordingly. In one example, multiple peripheral devices may be connected in the form of a daisy chain and coupled to the telematics device 130. In yet another example, one or more peripheral device 121 may be installed outside of a vehicle 120 and connected accordingly (e.g., a dash camera). The arrangement of a peripheral device 121 may vary in complexity depending on the purpose thereof.

Further, as illustrated, the vehicle 120 includes a vehicle module 124. There may be one or more vehicle modules included in the vehicle 120. The vehicle module 124 may include various devices for operation and control of the vehicle 120, such as mechanical module to lock and unlock a vehicle 120, engine, motor, power supply, steering, braking, doors, internal sensors, etc. In particular, the telematics device 130 may communicate with one or more electrical control units (ECUs) that control the vehicle modules 124.

The telematics device 130 is adapted to gather various telematics data from the vehicle modules via one or more vehicle interfaces connected to the interface 132. The vehicle interface 122 may be arranged in any suitable way. For example, the vehicle interface 122 may include on-board diagnostics (OBD-II) ports and/or Controller Area Network (CAN) buses. In some cases, the peripheral device 121 may be connected directly to the telematics device 130.

The asset management server 110, as shown, includes components such a processor 111, a data storage 113, and an interface 112. Each of these components may communicate with the others. Each of these components may be combined into fewer components or divided into additional subcomponents.

The processor 111 is arranged to control the operation of the asset management server 110. The processor 111 may execute various instructions, programs, software or combination thereof stored on the data storage 113 to implement various methods described therein. For example, the processor 111 may process various telematics data collected by the asset management server 110 and stored in the data storage 113. The processor 111 may be implemented using any suitable processing devices or systems, such as those described above in relation to the processor 131 of the telematics device 130.

The interface 112 is adapted to enable communication between the asset management server 110 and other devices such as the telematics device 130 or other systems or platforms. For example, the interface 112 may be used to receive and send data to the telematics device 130. The components are illustrated only exemplary, and their suitable implementation depends on how the asset management server is arranged (e.g., distributed, centralized, virtualized etc.) as indicated above. Thus, the interface 112 may be implemented using any suitable processing devices or systems, such as those described above in relation to the interface 132 of the telematics device 130.

The data storage 113 is adapted to store data that is received, processed and prepared for sending. The data storage 113 may store various instructions, programs, software or combination thereof executable by the processor 111 to implement various methods described therein. The data storage 113 may be implemented using any suitable processing devices or systems, such as those described above in relation to the data storage 133 of the telematics device 130.

The computing device 150 as shown in FIG. 2 may include a processor 151, a data storage 153, an interface 152 and a display 154. Each of the components of the computing device 150 may communicate with the others and may be combined into fewer components or divided into additional subcomponents.

The processor 151 may control the operation of the computing device 150. The processor 151 may be implemented using any suitable processing devices or systems, such as those described above in relation to the processor 131 of the telematics device 130. The processor 151 may execute various instructions, programs, software, or a combination thereof stored on the data storage 153 to implement various methods described herein. For example, the processor 151 may process various telematics data received from the asset management server 110, the telematics devices 130, or a combination thereof.

The data storage 153 is adapted to store various data for the computing device 150. The data storage 153 may be any suitable data storage device or system, such as those described above in relation to the data storage 133 of the telematics device. The data storage 153 may store various instructions, programs, software, or a combination thereof executable by the processor 151 to implement various methods described herein. The data storage 153 may also store telematics data received from the asset management server 110, the telematics devices 130, or a combination thereof.

The interface 152 is adapted to enable communication between the computing device 150 and other devices or systems, such as the asset management server 110. The interface 152 may be any suitable communication device or system, such as those described above in relation to the interface 112 of the asset management server 110. The interface 152 may enable various inputs and outputs to be received at and sent from the computing device 150. For example, the interface 152 may be used to retrieve telematics data from the asset management server 110.

The display 154 is adapted to visually present various data for the computing device 150. The display 154 may be implemented using any suitable display devices or systems, such as, but not limited to, light-emitting diode (LED) displays, liquid crystal displays (LCD), electroluminescent displays (ELDs), plasma displays, quantum dot displays, cathode ray tube (CRT) displays, and the like. The display 154 may be an integrated component that is integral with the computing device 150 or a standalone device that is removable connected to the computing device 150. The display 154 may display various visual representations of the telematics data.

Figure 3:
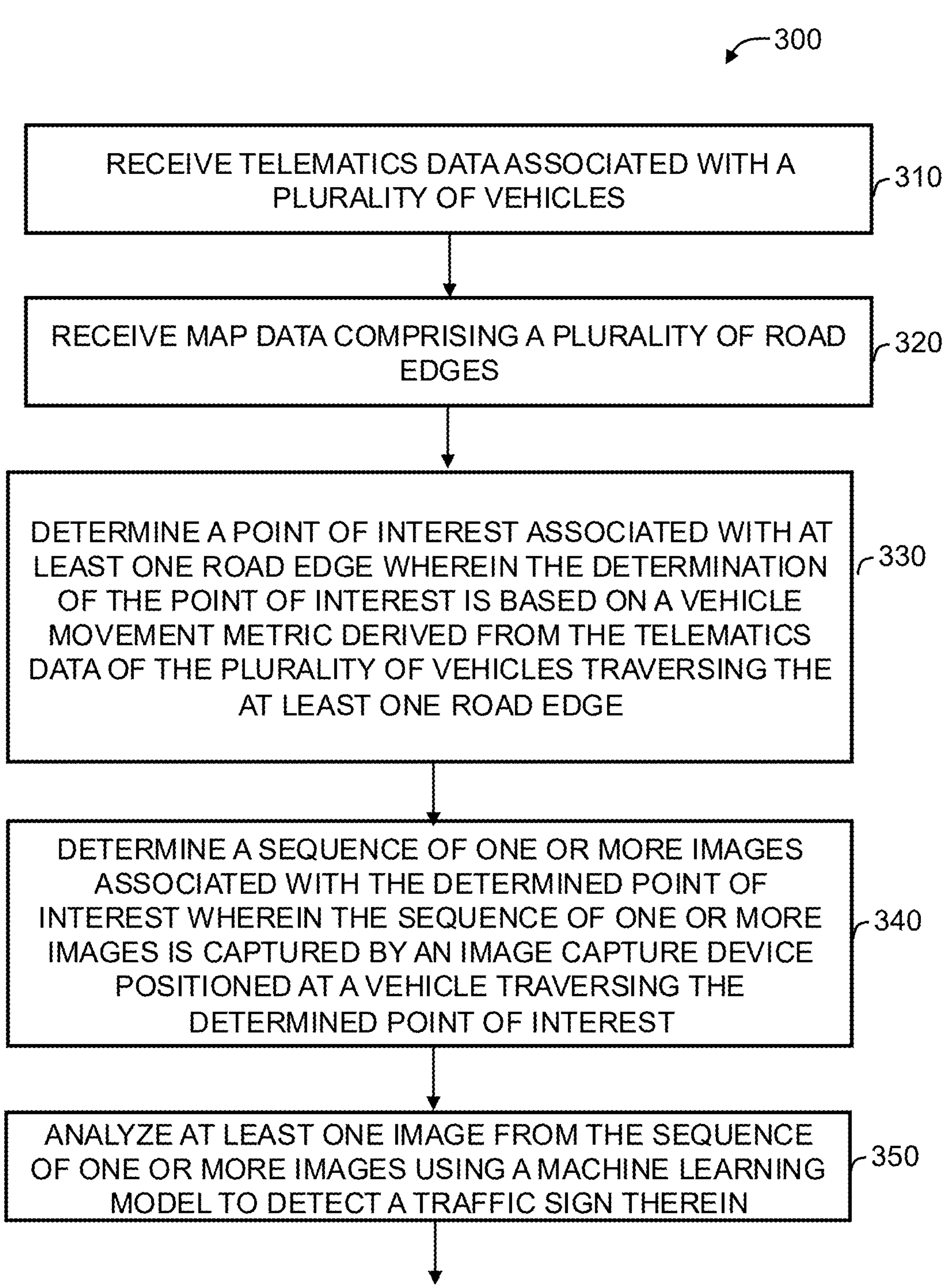
FIG. 3 is a flowchart diagram of a method for enhancing map data, according to an embodiment of the present disclosure.

Referring to FIG. 3, there is shown a flowchart diagram illustrating an example method 300 for enhancing map data of a road network according to an aspect of the present disclosure. The method 300 comprises the steps 310, 320, 330, 340, 350. It should be appreciated that additional steps could be added, or steps could be reordered as appropriate for a given application. The steps of method 300 may be implemented using any suitable combination of hardware and software, such as those described in reference to FIG. 1 and FIG. 2. For example, one or more steps (e.g., steps 310, 320, 330, 340 and/or 350) of the method 300 may be implemented at an image capture device as discussed with reference to FIG. 2 (e.g., by applying edge computing). In a further example, one or more steps (e.g., steps 310, 320, 330, 340 and/or 350) of the method 300 may be implemented in a vehicle such as the vehicle 120 (e.g., by the peripheral device 121 and/or by the telematics device 130 as discussed with reference to FIG. 2). In yet another example one or more steps (e.g., steps 310, 320, 330, 340 and/or 350) of the method 300 may be implemented in a device remote from the vehicle. In one example the remote device may be an asset management server such as the asset management server 110 or a remote server as described above or a combination thereof. For the sake of simplicity, throughout the present disclosure the term remote server is used in the context of any computing device remote from the vehicle performing the functionality according to the present disclosure.

In scenarios where at least a portion of the method 300 is implemented by a remote server, less processing is executed by telematics devices (e.g., the telematics devices 130) and/or other computing devices (e.g., image capture device). As a result, the hardware complexity of the telematics devices and/or the other computing devices may be reduced, which, in turn, reduces the costs associated with the implementation of the method 300. As well, it may also in some cases be easier to update and/or modify software running on a remote server as compared to telematics devices and/or other computing devices. On the other hand, in implementations where at least a portion of the method 300 is implemented by telematics devices (e.g., applying edge computing), less data is transmitted to a remote server thereby reducing network usage and network bandwidth. As will be appreciated, in such implementations, usage costs associated with network usage may in turn also be reduced. Thus, the method 300 may be implemented in a variety of ways and each implementation may have advantages associated therewith.

As shown in FIG. 3 at 310, telematics data associated with a plurality of vehicles is received. The telematics data may originate from the plurality of telematics devices installed in a plurality of vehicles. The telematics data may be obtained from the plurality of vehicles using, for example, one or more of the systems outlined in FIG. 1 and FIG. 2. For example, the telematics device 130 (e.g., the processor 131) may receive telematics data from the sensor 134, peripheral device 121, vehicle module 124, or a combination thereof. Alternatively, or additionally, the asset management server 110 (e.g., the processor 111) may receive telematics data from the telematics device 130. Additionally or alternatively, a remote server (as described further above) may receive telematics data from the asset management server 110.

The telematics data may be received in one or more various formats, standards, or protocols. In some implementations, the telematics data may be provided in form of raw vehicle data (e.g., positional data such as GPS data), ignition ON/OFF, date and time of a vehicle operation). In other implementations, the telematics data may be processed prior to and/or subsequently to being received or used. For example, the raw telematics data may be processed to determine speed data, acceleration data, distance traveled, stop duration, idling duration, driving duration among others. For some cases, the speed data can be measured by a speed sensor or derived from position data of a location sensor (such as the latitude data, longitude data and/or elevation data) and the corresponding time data. The acceleration data that represents the rate of change of velocity with respect to time of the vehicle may be measured by an acceleration sensor or derived from position data of a location sensor (such as the latitude data, longitude data, and/or elevation data) and the corresponding time data, and/or the speed data.

The telematics data that is transmitted and collected over a time period forms historical vehicle data which may be stored at the asset management server (e.g., data storage 113) and/or at the telematics device (e.g., data storage 133) for future analysis for example to analyze the performance of a single vehicle or a vehicle fleet. In some examples, the telematics data may be collected over a time period of sufficient duration to enable pattern recognition of the vehicle's operation (e.g., a duration between 7 days and 90 days). In some examples, the geographical location of a vehicle is monitored over some time period to determine patterns in vehicle movement. This determination may be based on the geospatial data (e.g., GPS coordinates, speed data) associated with the vehicle.

At 320, map data comprising a plurality of road edges is received. Throughout the present disclosure the term map data refers to an area of a road network from which the road edges may be derived. The map data may include information, parameters, attributes, characteristics, and/or features associated with a geographical area. For example, the map data may include information relating to the location, placement, size, shape, and/or design of infrastructure (e.g., road networks comprising road segments such as, but not limited to, roads, streets, highways, freeways, alleyways, motorways, motorways, trunk roads, primary roads, secondary roads, tertiary roads, etc.), topographical features (e.g., rivers, mountains, hills, greenways, etc.), regulatory features, (e.g., country borders, state or provincial borders, city limits, counties, neighbourhoods, etc.) or a combination thereof. The map data may be obtained from, for example, various map information providers such as OpenStreetMap (OSM).

Figure 4:
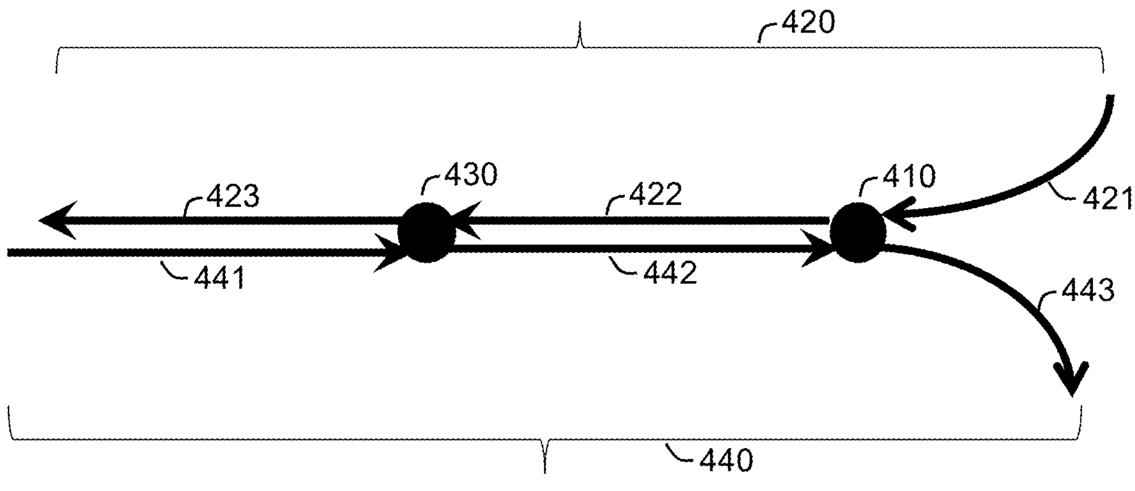
FIG. 4 is a schematic block diagram of an exemplary roadway constituted of exemplary road edges.

Referring to FIG. 4, a schematic view of an example of map data 400 is illustrated. In the shown example, roadway 420 and roadway 440 are illustrated. The arrows indicate the traffic directions of each of the roadways. The roadway 420 comprises a plurality of road edges; road edge 421, road edge 422 and road edge 423 and accordingly the roadway 440 comprises road edge 441, road edge 442 and road edge 443. The roadway 420 and the roadway 430 meet at the intersection 410 and the intersection 430.

In the context of the present disclosure, the term roadway refers to a geographical location that is a continuous geographical segment of the road network characterized by shared attributes such as, as not limiting examples, speed limit or road type. Accordingly, the term road edge refers to a geographical location that arise from the segmentation of roadway. A roadway may comprise a plurality of road edges. In other words, a road edge refers to any suitable and available segment of a roadway. In some examples a road edge may be equal to a roadway.

In some scenarios, it may be advantageous to apply a graph representation for representing a road network. In general, a graph representation comprises edges and nodes connected to represent the relationships between them. According to the present disclosure, the graph representation comprises one or more edges representing one or more road edges forming a roadway and one or more nodes that represent one or more connection points between edge nodes (e.g., road intersections) regardless of whether the edge nodes belong to the same roadway or not. The graph representation has the advantage of providing a structured and therefore more efficient way to determine relevant road edges.

Referring back to FIG. 3, at 330 it is proposed to determine a point of interest associated with at least one road edge of the plurality of road edges, wherein the determination of the point of interest is based on a vehicle movement metric derived from the telematics data of the plurality of vehicles traversing the at least one road edge.

In some examples, the determination of the point of interest may comprise a determination of a road intersection with the associated at least one road edge.

Such implementations are useful to narrow down the search for relevant point of interest by determining a specific geographical area, such as a road intersection. The term road intersection or intersection refers to a road node or road location where at least two different roadways meet. This approach may be useful when assuming that intersection between different roadways are road locations where traffic regulations may change, and therefore there may be a higher probability of appearance of a traffic sign, such as a speed limit sign or a stop sign. In some implementations, the determination of a road intersection may be based on unique identifiers assigned to both roadways and the road edges as indicated in the map data, so that an intersection can be identified as a road node having a node identifier where at least two roadways with different roadways identifiers share a common node identifier. Thus, if the roadway identifiers are different, the road location is classified as an intersection. Once an intersection is determined, the road edges that lead into the intersection are also identified by using their respective road edge identifiers as relevant road edges for the determination of the intersection that represents the point of interest.

In some examples, the determination of the point of interest may comprise a determination of a predefined geographical area with the associated at least one road edge, wherein the predefined geographical area is defined in relation to an infrastructural area.

Such implementations are useful to narrow down the search to a relevant point of interest by determining a specific pre-defined geographical area. This approach may be useful for specific geographical areas for that specific traffic regulations apply due to the characteristic of that area. In this case, the road edges that constitute that pre-defined geographical area may be considered as being relevant for the determination of the point of interest that is related to the pre-defined geographical area.

In some examples, the predefined geographical area may be defined in relation to an infrastructural area such as school neighborhood area, hospital neighborhood area, residence area, construction area, or highway. In one scenario, the predefined geographical area that is to be considered for a determination of the point of interest may comprise at least one road edge, preferably a plurality of road edges, for example in a predefined distance (e.g., 30 m) around an infrastructural point (e.g., school) of the infrastructural area.

In some examples, the vehicle movement metric is indicative of a pattern of vehicle movements on the at least one road edge. In the context of the present disclosure the term vehicle movement metric refers to any appropriate metric that is derived from any suitable and available telematics data indicating a pattern in the vehicle movement of a plurality of vehicles in a geographical area. In some examples, the vehicle movement metric is determined from the vehicle location data and/or vehicle speed data. Thus, the determination of the vehicle movement metric may be based on data from multiple sources, and/or of multiple types, such as location data received from a location sensor and vehicle speed data received from the speed sensor etc.

For example, in some implementations the vehicle movement metric may be derived from the telematics data indicating a position of a vehicle as provided by a location sensor (e.g., GPS sensor), which captures a location of the vehicle over time. Preferably, the telematics data of the plurality of vehicles and the map data are used in combination so that vehicle movement derived from the telematics data is mapped to the road edges in the map data that the plurality of vehicles traverse. In this regard, the vehicle movement metric may be determined based on changes in position of the plurality of vehicles over time as indicated in the location data, wherein the location data is integrated into the map data to determine a geographical area with the associated road edges the vehicles traverse. Using that approach enables that a vehicle movement pattern may be generated, for example it enables to recognize, in a predetermined geographical area such as a geographical area around a school, which road edges are located near the school front door, so that those road edges may be recognized as relevant for forming a point of interest as they may potentially include a traffic sign. The determination of the pattern of vehicle movements may be done in any appropriate and known manner. Thus, using the vehicle movement metric, a point of interest may be determined by identifying the road edges associated with the vehicle movement. The filtered road edges are then used for the subsequent processing. Such implementation has the advantage that the data to be processed is reduced to the determined point of interest.

As another example, the vehicle movement metric may be derived from the telematics data derived from the speed data as for example reported by a speed sensor. In some examples, the vehicle movement metric is indicative of speed pattern in the vehicle movements. In one example, the vehicle movement metric may be determined from the vehicles' movements in a geographical area. Using that approach enables that a vehicle movement pattern may be generated, for example it enables to recognize in a predetermined geographical area, such as a geographical area around a school, that the speed of vehicles on the road edges near the school is approximately 30 km/h. Based thereon, the road edges may be recognized and filtered as relevant for forming a point of interest as they may potentially include a traffic sign. The filtered road edges are then used for the subsequent processing. Such implementation has the advantage that the data that is to be processed is reduced to the determined point of interest. The determination of the pattern of vehicle movements may be done in any appropriate and known manner In some examples, the vehicle movement metric is indicative of a variability of vehicle speeds on the at least one road edge and is calculated as a speed entropy. The advantage of applying the speed entropy is that it provides a pattern of vehicle movement changes associated with the at least one road edge. The implementation of the speed entropy may be realized in any suitable way. In some implementations, a high value of calculated speed entropy at a location may indicate a high degree of variation in vehicle speeds, which may be correlated with drivers reacting to a traffic sign, such as a speed limit sign, by slowing down the speed of the vehicle or even by harsh breaking. This driving behavior leads to a high degree of variation in vehicle speeds, which may indicate the presence of a traffic sign on the road edge for which the speed entropy has been calculated.

The speed entropy is preferably calculated for each road edge that may be relevant for the determination of the point of interest. In the example of road intersection that forms a point of interest, for each road edge that injects an intersection the corresponding speed entropy is calculated. In the example of predefined geographical areas, all road edges that form the predefined geographical area may be considered as relevant for the calculation of the speed entropy. In yet another example, the speed entropy may be calculated for any road edge that has been recognized as relevant for the determination of the point of interest.

The speed entropy may be calculated using normalized information entropy formula:

$$H_n(p) = -\sum_i \frac{p_i \log_b p_i}{\log_b n}$$

Herein:

- $H_n(p)$: is the normalized speed entropy, which results in a value typically scaled between "0" and "1"
- $\Sigma_i$: represents the summation over all defined speed categories "i".
- $p_i$: is the probability or frequency of a vehicle's speed falling into a specific category i.
- $\log_b$: is the logarithm to a base b, wherein for information entropy a base 2 is commonly used
- n: is the total number of discrete speed categories, e.g. 'Slow', 'Medium', 'Fast'.

According to the speed entropy formula, the probability $p_i$ of a vehicle's speed falling into a specific speed category "i" is calculated by dividing the count of vehicles in a specific speed category by the total number of vehicles observed.

For the sake of explanation an example is provided to illustrate the speed entropy calculation. For the calculation, the speed data recorded from the plurality of vehicles traversing the road intersection is discretized into a predefined number of n speed categories. For example, the speeds may be grouped into speed categories "i" such as 'Slow' (e.g., 0-30 km/h), 'Medium' (e.g., 31-60 km/h), and 'Fast' (e.g., >60 km/h). Under the assumption that there are 10 recorded vehicle speeds (in km/h), e.g., 25, 50, 55, 28, 80, 52, 20, 48, 51, 85, the output of the categorizing may be Slow, Medium, Medium, Slow, Fast, Medium, Slow, Medium, Medium, Fast. In the next step the $p_i$ for each category is calculated and used in the base-2 log calculation.

At first $p_i$ are calculated. In this example, $$p_{slow} = \frac{3}{10} = 0.3,\ p_{medium} = \frac{5}{10} = 0.5,\ p_{fast} = \frac{2}{10} = 0.2.$$

As next the base-2 log is calculated:

$$p_{slow} \log_2(p_{slow}) = 0.3 \times \log_2(0.3) \approx 0.3 \times (-1.737) = -0.521$$

$$p_{medium} \log_2(p_{medium}) = 0.5 \times \log_2(0.5) = 0.5 \times (-1) = -0.500$$

$$p_{fast} \log_2(p_{fast}) = 0.2 \times \log_2(0.2) \approx 0.2 \times (-2.322) = -0.464$$

The sum of the results, $\Sigma_i = (-0.521) + (-0.500) + (-0.464) = -1.485$, is multiplied with $-1$ resulting in $$H(p) = -(-1.485) = 1.485$$

The number of categories "n" is 3 so that the normalized speed entropy results in:

$$H_n(p) = \frac{H(p)}{\log_2(n)} = \frac{1.485}{1.585} \approx 0.937$$

As indicated herein, the speed entropy is calculated for each of the relevant road edges and a road edge is assigned to a point of interest when the speed entropy indicates a high variability. Thus, the speed entropy, which serves herein as a vehicle movement metric, quantifies the variability of speeds for the plurality of vehicles traversing that road edge to determine if the road edge is to be assigned as a point of interest. According to the example above, a normalized speed entropy value approaching "1" indicates a maximum variability in vehicle speeds and thus signifies that a road edge is a strong candidate for being designated as a point of interest. Consequently, it is proposed to filter those road edges for which the calculated speed entropy exceeds a predefined threshold. The filtered road edges are then defined as the points of interest for subsequent processing. Such implementation has the advantage that the data that is processed is reduced to the determined point of interest.

In some cases, the speed entropy is calculated for each of a plurality of vehicle types and for a particular traffic time period. In some scenarios, it may be useful to calculate the speed entropy context-aware to increase the precision of determination of the point of interest. For example, calculating speed entropy for each vehicle type independently allows detection of vehicle type-specific road features. Various vehicle types may be identified, wherein a vehicle type is identified by the similar characteristics, such as vehicles may be categorized to a vehicle type based on the vehicle weight. Usually, light and heavy vehicles have different physical characteristics (e.g., speed, acceleration, braking). For example, light vehicles may consistently travel at 80 km/h and heavy vehicles at 70 km/h on the same road, so that a combined dataset would show high variability. Calculating speed entropy for each vehicle type separately allows correct determination of low speed entropy (i.e. low variability) within a vehicle type, thus avoiding a false positive determination of point of interest. In other examples, the calculation of a speed entropy may depend on the relevant time. Some traffic signs may only be relevant during specific hours (e.g., school zone speed limits). By calculating speed entropy only during time periods when a specific sign is relevant (e.g., 8:00 am-9:00 am), a more accurate identification of the relevant road edge may be achieved.

In some cases, the vehicle movement metric may be indicative of a frequency of vehicle braking events or vehicle stops derived from the corresponding telematics data for the at least one road edge. This approach may be particularly advantageous because it enables simpler calculation for the road edges with not that many various vehicles traversing said road edge, where a calculation based on speed entropy may lack sufficient input data. Alternatively, this approach may be useful to derive a different type of a possible traffic sign. For example, a number of vehicle stops may serve as a vehicle movement metric to recognize that a road edge is relevant to be assigned to a point of interest because there is a high probability of a presence of a stop sign. The frequency of vehicle braking events or vehicle stops may be derived from the appropriated telematics data (e.g., ignition data, speed data, motor data) according to any suitable technique known in the telematics field.

Referring back to FIG. 3, at 340 it is proposed to determine a sequence of one or more images associated with the determined point of interest wherein the sequence of one or more images is captured by an image capture device positioned at a vehicle traversing the determined point of interest.

As defined herein, the term sequence of one or more images refers to a sequence of images comprising one (e.g., picture) or more images (e.g., a sequence of pictures, a video). In some cases, one image may be captured while traversing the at least one road edge belonging to the determined point of interest. In other cases, time-shifted images may be captured while traversing at least one road edge belonging to the determined point of interest. In yet other cases a continuous video may be captured while traversing the at least one road edge belonging to the determined point of interest. Consequently, the sequence of one or more images is associated with the determined point of interest.

Throughout the present disclosure, the term image capture device refers to any suitable and applicable device adapted to capture one image (e.g., picture) or more images (e.g., a sequence of pictures, a video). The image capture device may be positioned at (mounted in/on, or placed within or on) a vehicle in any suitable manner. In one scenario, the image capture device may be a separate device adapted to capture image data and to provide the data to a telematics device (e.g., telematics device 130) or to a peripheral device (e.g., peripheral device 121) via an appropriate communication interface. In another scenario, the image capture device might be a peripheral device (e.g., peripheral device 121) integrated in a vehicle (e.g., vehicle 120). In yet another scenario, the image capture device might be an image sensor (e.g., image sensor 134) integrated in the vehicle. In yet another scenario, the image capture device may be adapted to communicate directly with a remote server (asset management server 110) via a communication network (e.g., network 140). In some implementations, the image capture device may be capable of processing the image data locally by applying an integrated object detection model (e.g., edge computing).

In some examples, the sequence of one or more images associated with the determined point of interest is determined by identifying at least one vehicle traversing the determined point of interest.

As indicated herein, the vehicles traversing a roadway may capture a sequence of one or more images (e.g., a picture(s) or a video) and to identify the relevant portion of the sequence of one or more images, at first the relevant vehicle is to be identified. Depending on the scenario, a vehicle may be identified in various ways and the vehicle identification may be based on any suitable metadata such as, vehicle id, vehicle trip data such as traversing road trip or traversed road trips with the associated roadway identifiers and road edge identifiers, the date and time of both entry into and exit from the road edge, etc. Using corresponding linking between the stored metadata, the relevant vehicle traversing the determined point of interest may be identified.

In some implementations, the identification of the relevant vehicle may be performed in real-time. That means a vehicle may be incented to capture a sequence of one or more images upon entering the determined point of interest based on any suitable information, such as information regarding the point of interest that may be pre-stored in the vehicle (e.g., data storage 133) and map data that is available to the driving vehicle so that that information in combination enables to recognize that a point of interest has been entered and a capturing of the sequence of one or more images is initiated. In case of an offline implementation that is based on an analysis of historical vehicle data, where data is analyzed offline, the identification of the vehicle may be based on any suitable metadata (e.g., vehicle id, vehicle trip data such as traversed road trips with the associated roadway identifiers and road edge identifiers, the date and time of both entry into and exit from the road edge) stored in an appropriate data storage (e.g., data storage 113 at the asset management server 110). Once the vehicle traversing the determined point of interest is identified, the corresponding sequence of one or more images may be fetched from the appropriate data storage, as it will be described further below.

In some examples, the sequence of one or more images associated with the determined point of interest is determined by identifying a time point when the vehicle enters the determined point of interest, and a time point when the vehicle leaves the determined point of interest.

In one example, the sequence of one or more images is determined by the time point when the vehicle enters the determined point of interest, and the time point when the vehicle leaves the determined point of interest. In case of real-time implementation, the time points may be determined when a vehicle enters and when it leaves the determined point of interest which may be based on any suitable information, such as information regarding the point of interest and map data that allows in combination to recognize that a point of interest is traversed. In case of an offline implementation, the determination of the time points may be based on any suitable historical metadata (e.g., vehicle id, vehicle trip data such as traversed road trips with the associated roadway identifiers and road edge identifiers, the date and time of both entry into and exit from the road edge) stored at an appropriate data storage. Once the time period a vehicle traversed the determined point of interest is identified, the corresponding sequence of one or more images may be fetched from the appropriate data storage (e.g., a data storage at a remote server, a data storage at the telematics device).

Thus, in case the determination of a sequence of one or more images associated with the determined point of interest is performed offline, once the point of interest is determined, the corresponding sequence of one or more images is queried from the appropriate data storage (e.g., asset management server 110, a remote server or a local data storage in a vehicle, such as data storage 133 or a data storage of a peripheral device 121). The process to retrieve the corresponding sequence of one or more images may include at first filtering the identified vehicles that traversed the point of interest within a predefined time window (e.g., within the last week) and which were equipped with an image capture device (e.g., vehicle dash cam). In this regard, to enable this query, various metadata, such as camera identifier, vehicle identifier (i.e. vehicle id), vehicle trip data, such as traversed road trips with the associated roadway identifiers and road edge identifiers, the date and time of both entry into and exit from the road edge etc. may be considered accordingly. Using any appropriate metadata, the relevant sequence of images associated with the vehicle that traversed the point of interest vehicle may be retrieved.

Referring back to FIG. 3, at 350 it is proposed to analyze at least one image from the sequence of one or more images using a machine learning model to detect a traffic sign therein for using the traffic sign to enhance the map data.

Generally, the present disclosure aims to minimize the amount of data that is to be processed by defining the relevant sequence of images, namely one or more images that is/are associated with the point of interest. By determining the point of interest, the analysis of data is limited to the one or more images captured while the vehicle traverses the relevant road edge associated with the determined point of interest. In some implementations, a sequence of one or more images captured by one vehicle may be considered. In other implementations, a plurality of sequences of one or more images captured by a plurality of vehicles traversing the point of interest may be considered.

In the context of the present disclosure, the term traffic sign refers to any traffic control object that may be relevant for being included into a map data. The primary purpose of a traffic sign is to regulate traffic, provide warnings of potential hazards, or to offer navigation guidance to ensure safety on the roadways. The term traffic sign encompasses not only conventional post-mounted traffic signs but may also refer to road surface markings or any other marking that communicate for example rules or alerts. Examples of a traffic sign may be a speed limit sign indicating the maximum or minimum legal speed, a stop sign requiring a vehicle to come to a complete stop, No Entry/Do Not Enter signs prohibiting access to a specific road, pedestrian crossing signs alerting drivers to a designated crossing area, service signs indicating the location of facilities like school, hospitals, traffic lights regulating traffic, sharp curve signs indicating a sharp turn in the road, etc.

In some implementations, particularly for applications requiring immediate analysis, the image capture device may be adapted to perform the analysis of the at least one image of the sequence of one or more images in real time. In this case, the analysis and object detection may be performed in the image capture device or in any appropriate device close to the image capture device (i.e. edge computing). For example, this may be implemented in a peripheral device (e.g., peripheral device 121) or it may be performed by a telematics device (e.g., telematics device 130). Such implementation can be in particular advantageous when the aim is to have an immediate detection of an object in an image.

In other implementations, the analysis of the at least one image from the sequence of one or more images may be performed offline. In some cases, the analysis and object detection may be performed remotely from the image capture device. For example, this may be implemented in a remote server (e.g., asset management server 110). In other cases, the offline analysis of the at least one image from the sequence of one or more images may be performed close to the image capture device based on the data stored locally.

In the context of the present disclosure, the analysis comprises a detection of a traffic sign in an image. For the analysis and detection of an object in an image any suitable and appropriate machine learning model may be applied, as it will be described further below.

In the context of the present disclosure, the term machine learning model refers to any suitable technique, that is adapted to identify objects (e.g., traffic signs) in an image captured by one or more image capture devices. In particular, the term machine learning model refers to any suitable image-processing machine learning model with the capability of object detection in an image. As it should be appreciated there are different known image-processing and/or object-detection machine learning models. In one example the machine learning model may be an appropriate computer vision technique that is based on exploration of color and shape in an image. Alternatively, or additionally, any suitable artificial intelligence model such as convolutional neural networks, vision transformers, generative adversarial networks etc. may be used. In some examples, the machine learning model may be a Multimodal Large Language Model MLLM or a zero-shot object detection model with a text recognition model, such as Optical Character Recognition OCR or a pre-trained object detection model with a text recognition model, such as OCR. In the current status of the ML technology, an MLLM includes LLM and connects it to a visual encoder. However, this specific architecture should not be seen as a limitation and any general-purpose machine learning model capable of object recognition may be utilized.

In some implementations, the machine learning model may be a machine learning model that is not trained for a particular application using a specifically labeled dataset, but which is a generally trained machine learning model (e.g., Large Language Model LLM). The Multimodal Large Language Model MLLM (e.g., GPT-4 Vision) is an example of a generally trained machine learning model. Upon receiving an image, the processing of that image is guided by a text-based prompt. The prompt is engineered to provide the MLLM with the context about the task, such as identifying a traffic sign (e.g., speed limit sign or stop sign), as well as instructions for the analysis thereof. The prompt may also include illustrative examples for handling specific scenarios, for instance, images containing unclear traffic signs. The advantage of using an MLLM is that it does not require any pre-processing of the images or any training of the machine learning model on a specifically labeled dataset for detection of traffic signs. Furthermore, the MLLM may concurrently perform both the localization of the speed limit sign within the image and the recognition of the numerical characters depicted thereon. By processing combined image and text inputs, the MLLM interprets the visual information in the image with the advantage that the combined processing of a traffic sign detection and of the included text is a one-stage process. As it will be appreciated the MLLM serves as an example of a ML model capable to interpret the visual information in the image by processing a traffic sign detection and text recognition in one-stage process.

In other implementations, the analysis of the at least one image from the sequence of one or more images may be performed using a two-stage process that comprises an object detection model and a separate text recognition model. In the first stage, a machine learning model (e.g., deep learning-based object detection model) processes the image to identify a region of interest (e.g., potential traffic sign). In the second stage, the identified region of interest is provided as input to a text recognition model, such as, but not limited to an Optical Character Recognition (OCR), LLM or any computer vision model. A text recognition model (e.g., OCR) is configured to analyze the specific region of interest to extract the numerical (e.g., speed limit) or textual characters (e.g., stop sign) contained therein. A final validation step may then be applied to the extracted characters to select the most probable prediction, for example for the speed limit value. Preferably, a deterministic, rule-based filtering system is then used to validate the output from the text recognition model (e.g., OCR). For example, for a speed limit sign, such rules may verify whether the extracted numerical value falls within a plausible range (e.g., 0-120 km/h), or whether it is a multiple of a standard increment (e.g., a multiple of 5, such as 30 km/h, 50 km/h), and the rules may include a logic for selecting the most appropriate value if multiple traffic signs are detected.

In some cases, the two-stage process may be implemented using a so-called zero-shot object detection model (e.g., Grounding DINO) followed by a text recognition model (e.g., OCR). The zero-shot object detection model is capable of detecting objects for which it has not been specifically trained. This is achieved through text-guided object detection, which facilitates the localization of an object using a text prompt, such as "traffic sign" or "speed limit sign," or "stop sign". In the second stage, the text recognition model (e.g., OCR) is applied to the identified region of interest as described above. The advantage of this zero-shot approach is that it does not require a pre-labeled dataset of traffic signs to be trained.

In other cases, the two-stage process may be implemented using a pre-trained object detection machine learning model in the first stage which may be pre-trained in a supervised manner. This requires the machine learning model to be trained on a labeled dataset of images in which for example the traffic signs (e.g., speed limit signs or stop signs) have been previously and accurately annotated. During operation, the pre-trained machine learning model processes an image to detect and locate a region of interest corresponding for example to a speed limit sign. Exemplary pre-trained object detection models may include various versions of the YOLO (You Only Look Once) model. Subsequently, in the second stage, a text recognition model (e.g., OCR) is applied to the detected region to extract numerical text the numerical (e.g., speed limit) or textual characters (e.g., stop sign) contained therein as described above.

In some examples, the step of analyzing at least one image from the sequence of one or more images may comprise extracting at least one key frame from the sequence of one or more images and applying an object detection machine learning model to detect a traffic sign in the at least one key frame.

In order to additionally limit the amount of data that is processed, the analysis of a captured sequence of one or more images may be performed by first extracting at least one keyframe from the sequence of one or more images. The term keyframe, as used herein, refers to a self-contained, independently encoded picture within a sequence of images. In case of one image the keyframe corresponds to the one captured image. In particular, the method of keyframe extraction is relevant when using a video coding and herein the keyframe extraction depends on the used video encoding format.

For example, in the video codec MPEG, the I-frames (Intra-coded pictures) may be extracted to serve as the keyframes. According to the MPEG codec, an I-frame comprises a complete image, whereas intermediate frames, such as P-frames and B-frames, store only differential data representing changes between subsequent frames. As I-frames occur much less frequently than intermediate frames, their selective extraction reduces the number of images that require analysis. In another example, in the video codec Motion JPEG (MJPEG) every frame is a self-contained, independently encoded image. In such a case, a sampling approach may be employed wherein keyframes for analysis are extracted from the video stream for example at a fixed interval.

Upon extracting the at least one keyframe, any suitable machine learning model may be applied on the keyframe to detect an object (e.g., a traffic sign) therein as described previously. The keyframes may be treated as standard, independent images and fed directly into any appropriate object detection model. In particularly as the image capture device may generate video at high frame frequencies (e.g., 30 or 60 frames per second), the approach of extracting keyframes for data analysis significantly reduces the amount of data to be processed while providing a complete image for the machine learning model can ensure the accuracy of traffic sign detection.

In the light of the above, upon detecting a traffic sign in an image, the traffic sign may be used to enhance the map data. Aspects of the present disclosure thus provide methods and systems that enhance map data by automatically generating a more reliable, updated and large dataset with traffic signs in an efficient manner. In one scenario, the at least one detected traffic sign may be used to be included into the map data of the road network. The detected traffic sign may be particularly mapped to the corresponding road edge in the map data. The more adequate, reliable and updated map data may be for example useful in a fleet management system to enhance the safety of a driver when driving a vehicle. In another scenario, in such a manner generated dataset with traffic signs may be used for training a more accurate and robust traffic sign prediction model for predicting for example speed limit on roadways with unknown speed limit. Generally, in such a manner generated dataset with traffic signs serves as a ground-true dataset for being used in any appropriate and suitable use case.

Figure 5:
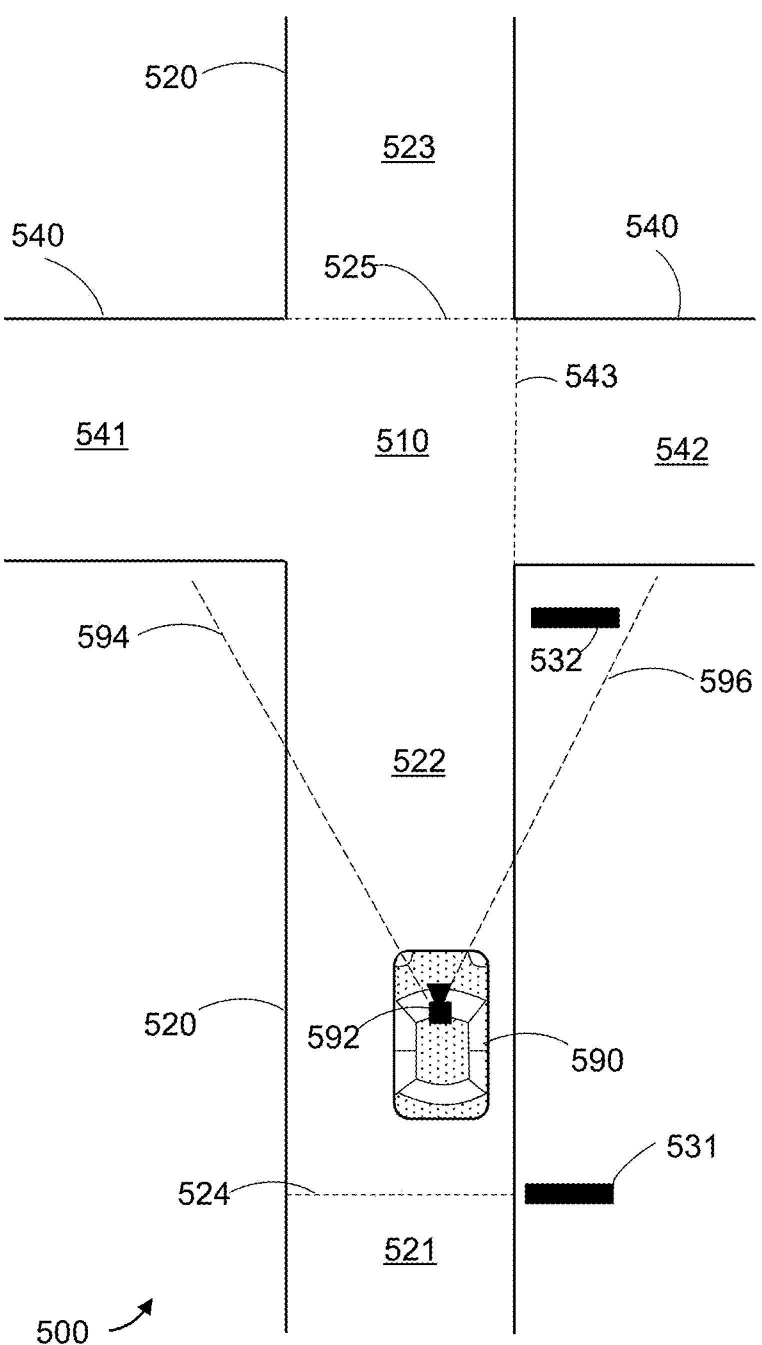
FIG. 5 is a top view of an exemplary traffic environment, according to an embodiment of the present disclosure.

Referring now to FIG. 5, which is an exemplary scenario for implementing the method 300 in FIG. 3. With reference to an exemplary scenario illustrated in FIG. 5, the determination of the point of interest based on an intersection is discussed. However, the method 300 is applicable to various scenarios, and the scenario shown in FIG. 5 should not be construed as limiting.

FIG. 5 illustrates a top view of a driving environment 500, specifically showing an intersection 510. The intersection 510 is a road node (i.e., a connection point) that connects roadway 520 and roadway 540. The roadways are constituted of the corresponding road edges that meet at the intersection 510.

The roadway 520 as illustrated comprises three road edges: road edge 521, road edge 522, and road edge 523. The roadway 540 as illustrated comprises road edge 541 and road edge 542. Examples of traffic signs are depicted; an example of a traffic sign 531 is shown on the road edge 521, and an example of a traffic sign 532 is shown on the road edge 522. In some implementations, the traffic sign 532 may be a speed limit sign, indicating that vehicles approaching intersection 510 by roadway 520 must adapt their speed according to the speed limit shown on the traffic sign. In other implementations, the traffic sign 532 may be a stop sign, indicating that vehicles approaching intersection 510 by roadway 520 must stop before the intersection.

A vehicle 590 is depicted on the road edge 522. The vehicle 590 is equipped with an image capture device 592 adapted to capture a sequence of one or more images. The field of view for the image capture device 592 is represented by dashed lines 594 and 596. As illustrated, the traffic sign 532 is positioned within the field of view so that the field of view can be captured by the image capture device 592.

The dotted line 524 illustrates schematically and exemplary an end of the road edge 521 and at the same time beginning of the road edge 522 forming a connection point which is a road node. Accordingly, the dotted line 525 illustrates schematically and exemplary the end of the road edge 522 and beginning of the road edge 523 forming a connection point which is a road node and the dotted line 543 illustrates schematically and exemplary the end of the road edge 541 and beginning of the road edge 542 forming a connection point which is a road node.

The road node 524 at which two road edges, road edge 521 and road edge 522 meet, belong to the same roadway. According to one implementation, the road node 524 may be therefore filtered out as not being relevant for the determination of the point of interest because it does not belong to an intersection. As described above, an intersection is defined as a road node having a node identifier where at least two roadways with different roadways identifiers share a common node identifier. Thus, because the roadway identifiers are the same, the road node is not classified as an intersection.

In contrast thereto, the road edge 522 meets the road edge 541 at the intersection 510. After analyzing that the road edges 522 and 541 belong to different roadways, respectively to roadway 520 and roadway 540, the analysis results in outputting that the connection point at which the road edge 522 and the road edge 541 meet is an intersection 510. The analysis may be based on the comparison of the corresponding identifiers as described above.

In order to verify that an intersection may be a point of interest, the vehicle movement metric of the road edges leading to the intersections is considered. In the illustrated scenario 500, the vehicle 590 approaches the intersection 510. Upon noticing traffic sign 532, it is assumed herein that the driver of vehicle 590 changes the driving behavior, meaning that the driver most likely slows down. Based on a plurality of vehicles traversing the road edge 522, a speed entropy for the road edge 522 is calculated. It is assumed herein, that the speed entropy due to the presence of the traffic sign 532 is high. Consequently, the intersection 510 with the assigned road edge 522 is determined as point of interest. Subsequently, the relevant sequence of one or more images for the road edge 522 is considered. In case of a real-time implementation, the sequence of one or more images while being captured is analyzed. In case of an offline implementation, the vehicle traversing the road edge is identified and the part of the sequence of images that is assigned to the time when traversing the road edge 522 is analyzed. The analysis may be performed as described further above, for example by extracting key frames in a first stage and by applying an appropriate and suitable machine learning model to detect on one of the captured images, the traffic sign 532.

The detected traffic sign may be included into an own ground-truth dataset that may be used for training a traffic sign prediction model, or the detected traffic sign may be provided as input to update the map data directly leading to an enhancement of the map data map data of a road network.

In the present disclosure, all terms referred to in singular form are meant to encompass plural forms of the same. Likewise, all terms referred to in plural form are meant to encompass singular forms of the same. Unless defined otherwise, all technical and scientific terms used herein have the same meaning as commonly understood by one of ordinary skill in the art to which this disclosure pertains.

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

The invention claimed is:

1. A method for enhancing map data of a road network, the method comprises operating at least one processor to:
- receive telematics data originating from a plurality of telematics devices installed in a plurality of vehicles;
- receive the map data wherein the map data comprising a plurality of road edges,
- determine a point of interest associated with at least one road edge of the plurality of road edges, wherein the determination of the point of interest is based on a vehicle movement metric derived from the telematics data of the plurality of vehicles traversing the at least one road edge;
- determine a sequence of one or more images associated with the determined point of interest wherein the sequence of one or more images is captured by an image capture device positioned at a vehicle traversing the determined point of interest; and
- analyze at least one image from the sequence of one or more images using a machine learning model to detect a traffic sign therein for using the detected traffic sign to enhance the map data.

2. The method according to claim 1 wherein the determination of the point of interest comprises a determination of a road intersection with the associated at least one road edge.

3. The method according to claim 1 wherein the determination of the point of interest comprises a determination of a predefined geographical area with the associated at least one road edge, wherein the predefined geographical area is defined in relation to an infrastructural area.

4. The method according to claim 1 wherein the vehicle movement metric is indicative of a pattern of vehicle movements on the at least one road edge.

5. The method according to claim 1 wherein the vehicle movement metric is indicative of a variability of vehicle speeds on the at least one road edge and calculated as a speed entropy.

6. The method according to claim 5 wherein the speed entropy is calculated for each of the at least one road edges and a road edge is assigned to a point of interest when the speed entropy indicates a high variability.

7. The method according to claim 5 wherein the speed entropy is calculated for each of a plurality of vehicle types and for a particular traffic time period.

8. The method according to claim 1 wherein the vehicle movement metric is indicative of a frequency of vehicle braking events or vehicle stops derived from the telematics data for the at least one road edge.

9. The method according to claim 1 wherein the sequence of one or more images associated with the determined point of interest is determined by identifying a vehicle traversing the determined point of interest.

10. The method according to claim 9 wherein the sequence of one or more images associated with the determined point of interest is determined by identifying a time point the vehicle enters the determined point of interest and a time point the vehicle leaves the determined point of interest.

11. The method according to claim 1 wherein the machine learning model is an image-processing machine learning model.

12. The method according to claim 11 wherein the machine learning model is configured to process the traffic sign detection and a text related to the traffic sign as a one-stage process.

13. The method according to claim 11 wherein the machine learning model is configured to process the traffic sign detection and a text related to the traffic sign as a two-stage process comprising detecting the traffic sign in a first stage and recognizing a text related to the traffic sign in a second stage.

14. The method according to claim 1 wherein the step of analyzing the at least one image from the sequence of one or more images comprises extracting at least one key frame from the sequence of one or more images and applying the machine learning model to detect the traffic sign in the at least one key frame.

15. A system for enhancing map data of a road network, the system comprising:

at least one data storage operable to store telematics data originating from a plurality of telematics devices installed in a plurality of vehicles; and at least one processor in communication with the at least one data storage, the at least one processor operable to:

receive telematics data originating from a plurality of telematics devices installed in a plurality of vehicles;

receive the map data wherein the map data comprising a plurality of road edges, determine a point of interest associated with at least one road edge of the plurality of road edges, wherein the determination of the point of interest is based on a vehicle movement metric derived from the telematics data of the plurality of vehicles traversing the at least one road edge;

determine a sequence of one or more images associated with the determined point of interest wherein the sequence of one or more images is captured by an image capture device positioned at a vehicle traversing the determined point of interest; and analyze at least one image from the sequence of one or more images using a machine learning model to detect a traffic sign therein for using the detected traffic sign to enhance the map data.

16. The system according to claim 15, wherein the at least one processor is further operable to determine the point of interest by determining a road intersection with the associated at least one road edge.

17. The system according to claim 15 wherein the wherein the at least one processor is further operable to determine a predefined geographical area with the associated at least one road edge, wherein the predefined geographical area is defined in relation to an infrastructural area.

18. The system according to claim 15 wherein the vehicle movement metric is indicative of a variability of vehicle speeds on the at least one road edge and calculated as a speed entropy.

19. The system according to claim 18 wherein the speed entropy is calculated for each of the at least one road edges and a road edge is assigned to a point of interest when the speed entropy indicates a high variability.

20. The system according to claim 15 wherein the at least one processor is further operable to analyze the at least one image from the sequence of one or more images by extracting at least one key frame from the sequence of one or more images and applying the machine learning model to detect the traffic sign in the at least one key frame.

* * * * *